(12) United States Patent
Fink et al.

(10) Patent No.: US 12,311,220 B2
(45) Date of Patent: May 27, 2025

(54) WEIGHT MACHINE SENSOR SYSTEM

(71) Applicants: ShapeLog, Inc., Ann Arbor, MI (US);
Life Fitness, LLC, Franklin Park, IL (US)

(72) Inventors: Jeremy L. Fink, Anoka, MN (US);
Nolan Orfield, Ann Arbor, MI (US);
Jack Laven, Loveland, CO (US);
Andrew Muth, Ann Arbor, MI (US)

(73) Assignees: ShapeLog, Inc., Ann Arbor, MI (US);
Life Fitness, LLC, Franklin Park, IL (US)

(*) Notice: Subject to any disclaimer, the term of this patent is extended or adjusted under 35 U.S.C. 154(b) by 165 days.

(21) Appl. No.: 18/051,824

(22) Filed: Nov. 1, 2022

(65) Prior Publication Data

US 2023/0139629 A1    May 4, 2023

Related U.S. Application Data

(60) Provisional application No. 63/263,463, filed on Nov. 3, 2021.

(51) Int. Cl.
*A63B 21/00*  (2006.01)
*A63B 21/062* (2006.01)
*G01G 19/18*  (2006.01)

(52) U.S. Cl.
CPC ........ *A63B 21/154* (2013.01); *A63B 21/0628* (2015.10); *A63B 21/152* (2013.01); *G01G 19/18* (2013.01); *A63B 2220/833* (2013.01)

(58) Field of Classification Search
CPC . A63B 21/0628; A63B 21/154; A63B 21/062; A63B 21/0626; A63B 21/063; A63B 21/0632; A63B 2220/833; A63B 2220/52; A63B 2225/02; A63B 2225/50; G01G 19/18
See application file for complete search history.

(56) References Cited

U.S. PATENT DOCUMENTS

| | | | | |
|---|---|---|---|---|
| 5,945,665 A | * | 8/1999 | Hay | G01B 11/18 356/482 |
| 10,905,916 B1 | * | 2/2021 | Malik | A61B 5/1128 |
| 11,235,201 B2 | * | 2/2022 | Orfield | A63B 21/0628 |
| 2008/0242512 A1 | * | 10/2008 | Kim | A63B 21/065 482/8 |
| 2010/0329602 A1 | | 12/2010 | Shah et al. | |

FOREIGN PATENT DOCUMENTS

| | | |
|---|---|---|
| KR | 200340194 Y1 | 1/2004 |
| KR | 20100020799 A | 2/2010 |
| KR | 20210065265 A | 6/2021 |

OTHER PUBLICATIONS

International Search Report for Application No. PCT/US2022/079136; mailed Mar. 16, 2023; 4 pp.

* cited by examiner

*Primary Examiner* — Megan Anderson
(74) *Attorney, Agent, or Firm* — Bodman PLC

(57) ABSTRACT

A load sensor includes a bolt configured to support a pulley of a weight machine, and a strain gauge laminated onto an exterior surface of a shoulder section of the bolt.

20 Claims, 13 Drawing Sheets

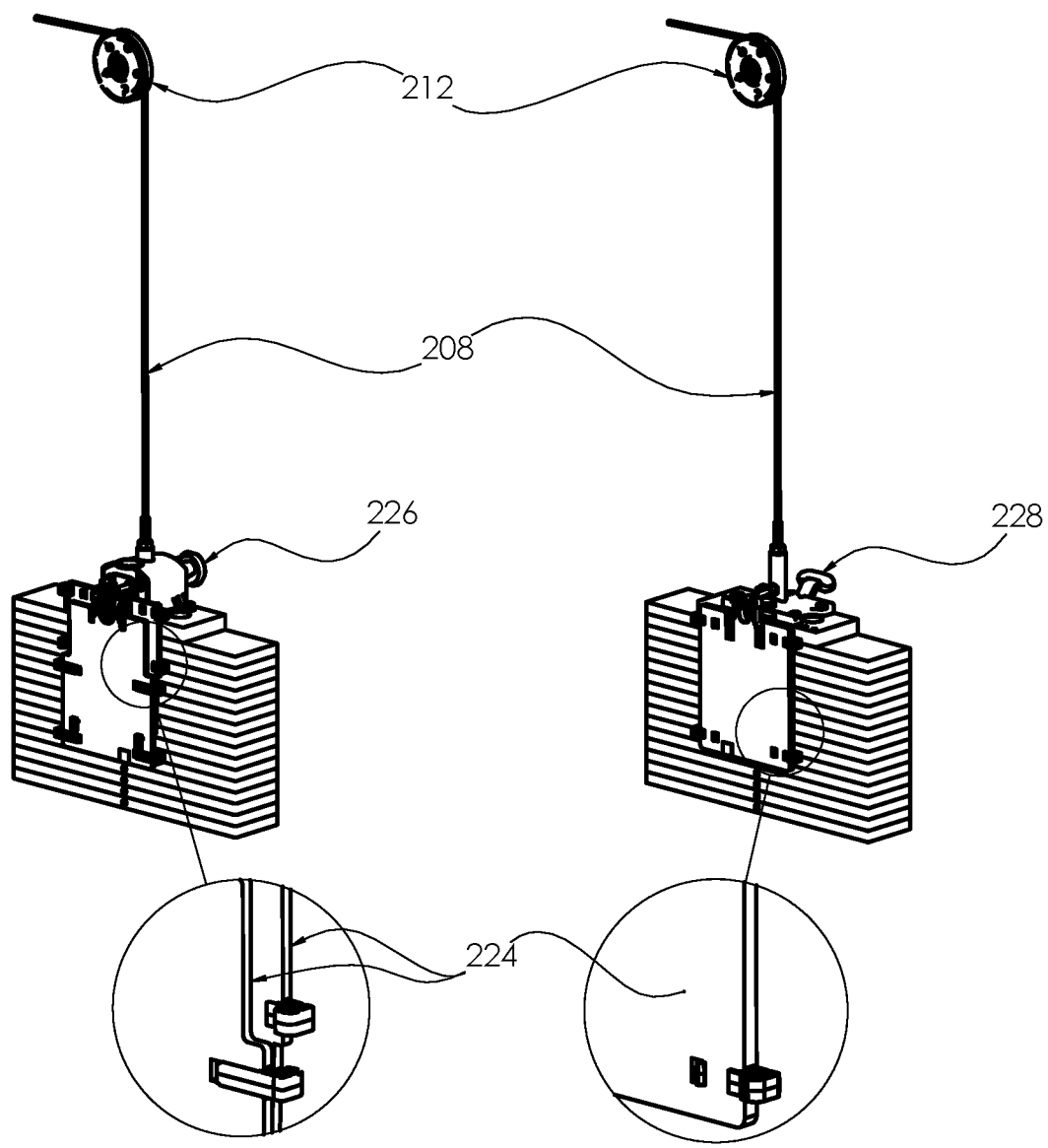
FIGURE 3A                    FIGURE 3B

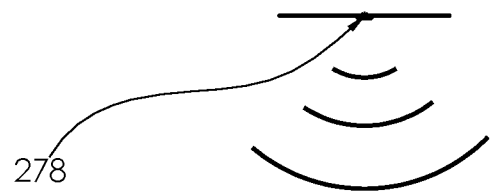
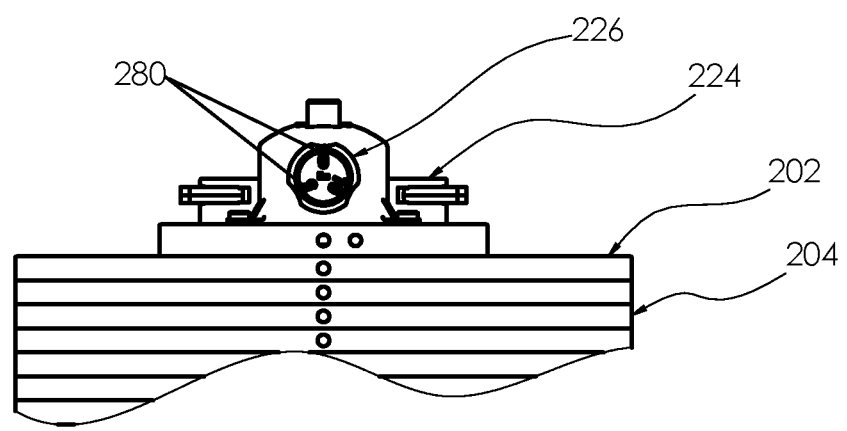
FIGURE 7

WEIGHT MACHINE SENSOR SYSTEM

CROSS-REFERENCE TO RELATED APPLICATION(S)

This application claims priority to and the benefit of U.S. Provisional Application No. 63/263,463, filed Nov. 3, 2021, the entire disclosure of which is incorporated by reference herein.

BACKGROUND

The proliferation of fitness sensors has enabled more engaging user experiences for exercisers. Data produced from the sensors can be gathered and transmitted wirelessly in a variety of formats to enable more personalized exercise plans, more granular insights into human performance, and sharing of workout results across digital communities. Strength equipment, however, has lagged behind cardiovascular equipment due to unique challenges that prohibit efficient scaling.

TECHNICAL FIELD

The present disclosure relates to weight machines and, in particular, sensor systems therefor.

SUMMARY

Disclosed herein are implementations of weight machine sensor systems, sensors thereof, and methods related thereto. In one implementation, a load sensor includes a bolt configured to support a pulley of a weight machine, and a strain gauge laminated onto an exterior surface of a shoulder section of the bolt.

The shoulder section may include a stress concentration geometry that may axially overlap the strain gauge and may be a recess extending circumferentially at least partially around an axis of the bolt. The bolt may be configured to orient the strain gauge relative to the weight machine in a predetermined orientation, and may include an alignment feature that is a flat face of the shoulder section that mates with a corresponding alignment feature of a bracket of the weight machine. The corresponding alignment feature may be a non-circular through-hole. The predetermined orientation may include the strain gauge being in one of tension or shear when the pulley is loaded.

In an implementation, a weight machine sensor system is provided for determining a weight setting of a weight machine having weight plates and incremental weights to be lifted during an exercise. The system includes a load sensing bolt and a controller. The load sensing bolt is configured to support a pulley of the weight machine and includes a strain gauge for sensing force transferred from the weight plates and the incremental weights by the pulley to the load sensing bolt. The controller is in communication with the load sensing bolt, and determines a weight setting of the weight machine according to the load sensing bolt.

The weight sensor system may further include an incremental weight sensor configured to detect whether the force includes one or more incremental weights. The controller may be in communication with the incremental weight sensor and may determine the weight setting of the weight machine according to the load sensing bolt and the incremental weight sensor. The controller may calculate a weight measurement value from the force sensed by the load sensing bolt, and may determine the weight setting with a rounding algorithm according to the weight measurement value and a signal received from the incremental weight sensor indicating whether the incremental weights lifted during the exercise. The rounding algorithm may account for weight values, numbers, and sequencing of the weight plates.

In an implementation, a method is provided for retrofitting a weight machine with a weight machine sensor system that is configured to determine a weight setting of the weight machine during an exercise. The weight machine is of a type having a weight stack with weight plates that are to be lifted during the exercise. The method includes: providing a weight machine sensor system that includes a load sensing bolt and a controller; replacing a pulley bolt of the weight machine with the load sensing bolt to support a pulley of the weight machine, the load sensing bolt being configured to sense force applied by the pulley thereto; and calibrating the load sensing bolt to determine a weight function by which a weight measurement value can be determined from a force value output by the load sensing bolt.

The weight machine may be of a type having incremental weights that are to be selectively lifted with the weight plates of the weight stack during the exercise. The weight machine sensor system may include an incremental weight sensor that may be configured to sense which of the incremental weights of the weight machine are being lifted or are to be lifted during the exercise. The method may further include installing the incremental weight sensor to the weight machine. The calibrating may include lifting the weight stack at different weight settings, measuring force values at the different weight settings, and determining the weight function according to the force values and the different weight settings.

BRIEF DESCRIPTION OF THE DRAWINGS

FIGS. 3A and 3B provide views of two mechanisms for engaging incremental weights on a weight machine to provide finer adjustments to the weight setting than the primary weight plates in the weight stack allow.

FIG. 7 shows an alternative method for incremental weight usage detection that features reflective surfaces that vary in distance from a ranging sensor depending on the orientation of the selector knob.

DETAILED DESCRIPTION

Figure 1:
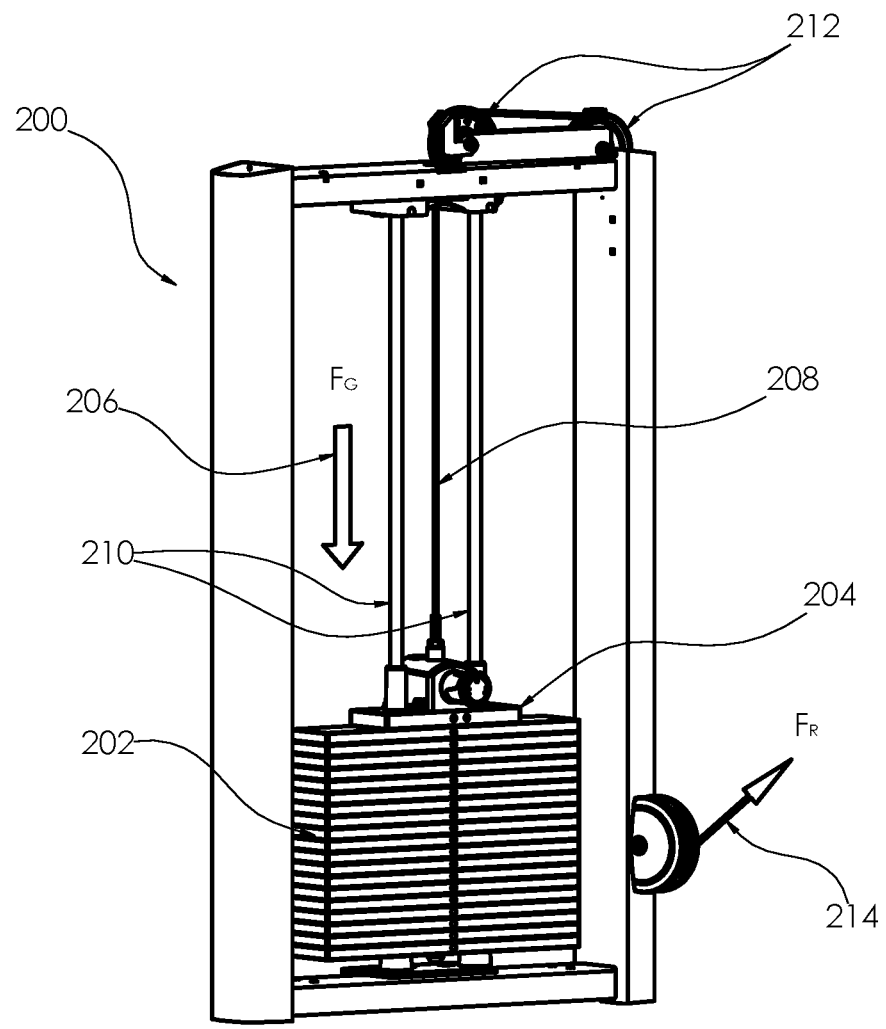
FIG. 1 shows the most common elements of a weight machines which delivers an exercise resistive force by raising a weight stack comprised of weight plates against the force of gravity using a cable or belt in tension to transfer that force.

Exercise is critical for human physical and emotional health. Many people understand these benefits and strive to integrate exercise into their routines but fail because they become bored with the experience or do not get results. Digital user experiences for runners and cyclists, for example, have been popularized by using human performance data as a way to provide motivation, demonstrate progress, provide data-driven coaching instructions, and create content that can be shared in digital formats within online communities. Often human performance data can be captured through wearable technologies such as a smart watch, chest strap, foot pod, etc. In the example of cycling there are well-established technologies such as cadence sensors and power meters that attach directly onto the bike. For resistance training, however, it is difficult to measure force in a consistent manner across the variety of machine configurations and therefore no such technologies have achieved meaningful market adoption.

Resistance training, also commonly called strength training or weightlifting, is one of the most common forms of exercise in the world and yet it has not experienced the same proliferation of digital user experiences due to the lack of appropriate sensor data. Heart rate monitors do not measure responses adequate for anaerobic activity and generally are more useful for measuring relative effort rather than actual performance. Furthermore, wearable technologies cannot capture human motion for extremities on which it is not attached. For example, a smart watch worn on the wrist is motionless while an exerciser is performing a seated leg curl. Most importantly, the key metric for resistance training is the amount of resistance used for that exercise—typically measured in force and/or the mass moved against gravity—and such metrics are difficult to measure without sensors directly integrated into the source of resistance itself. The weight machine force sensor described herein produces this resistance data from conventional weight machines that are widespread within the fitness industry yet have remained mostly non-digitized to date.

A common form of resistance training uses a machine designed to mechanically isolate exerciser motion to target the desired muscle group. Motion resistance is usually provided through cable tension directed through a series of pulleys and cams to a resistance source. The difficulty level depends on user selected resistance based on ability and training goals. One form of resistance machine, commonly called "selectorized" features a stack of weights configured such that the exerciser selects a quantity of weight by inserting a pin, flipping a paddle, or any other such mechanism for isolating which weight plates are moved. These weight plates could be in fixed increments of 10, 15, or 20 lbs, for example, to make the values easier for the exerciser to remember. Some machines have consistent weight plate values while others have weight stacks that feature two or more major weight plate values. For example, the weight stack could use a stack of twenty 15 lb plates for a total mass of 300 lbs or it could feature five 20 lb plates at the bottom of the stack then twenty 10 lb plates at the top of the stack to achieve the same total mass of 300 lbs. During the exercise motion the weights selected by the exerciser are typically moved upward against the direction of gravity, so the level of resistance is proportional to the quantity of weight selected. In some cases, however, selectorized machines can be designed such that the weight selected reduces the amount of resistance by effectively subtracting that resistance from the exerciser's body weight during body weight exercises. In these scenarios the weight moves downward with the direction of gravity during the exercise motion. This is applicable for pull ups or assisted chin dips, for example, where the exerciser's body weight is the source of resistance.

FIG. 1 shows a sample weight machine 200 resistance mechanism in which the weight stack 202 is comprised of weight plates 204 of uniform mass. A cable 208 or belt is used to transfer a resistive force imparted by the exerciser during the exercise motion to the weight stack 202 causing it to move against the force of gravity 206. Guide rods 210 are used to constrain the motion of the weight stack 202 to the intended vertical direction. Any configuration of levers, cams, pulleys 212, etc. can be used to redirect the exercise resistive force 214 delivered by the exerciser to the weight stack 202. The weight machine 200 can take on a wide variety of possible mechanical configurations depending on the exercise motion and its target muscle groups, but they commonly feature at least one pulley 212 directly above the weight stack 202 to ultimately redirect the cable 208 down toward the weight stack 202.

Figure 2A:
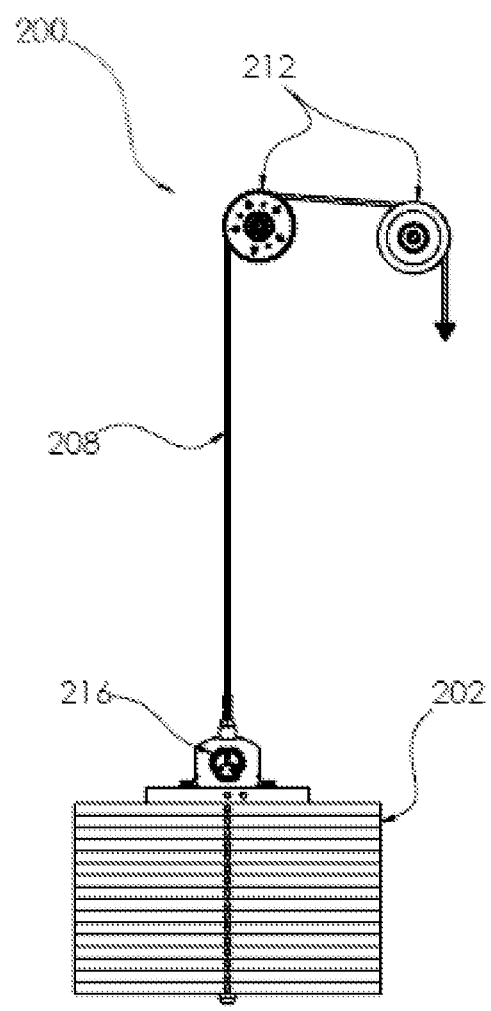
FIGS. 2A to 2C illustrate some examples of cable linkage configurations that are used to raise and lower the weight stack of a weight machine.
Figures 2B, 2C:
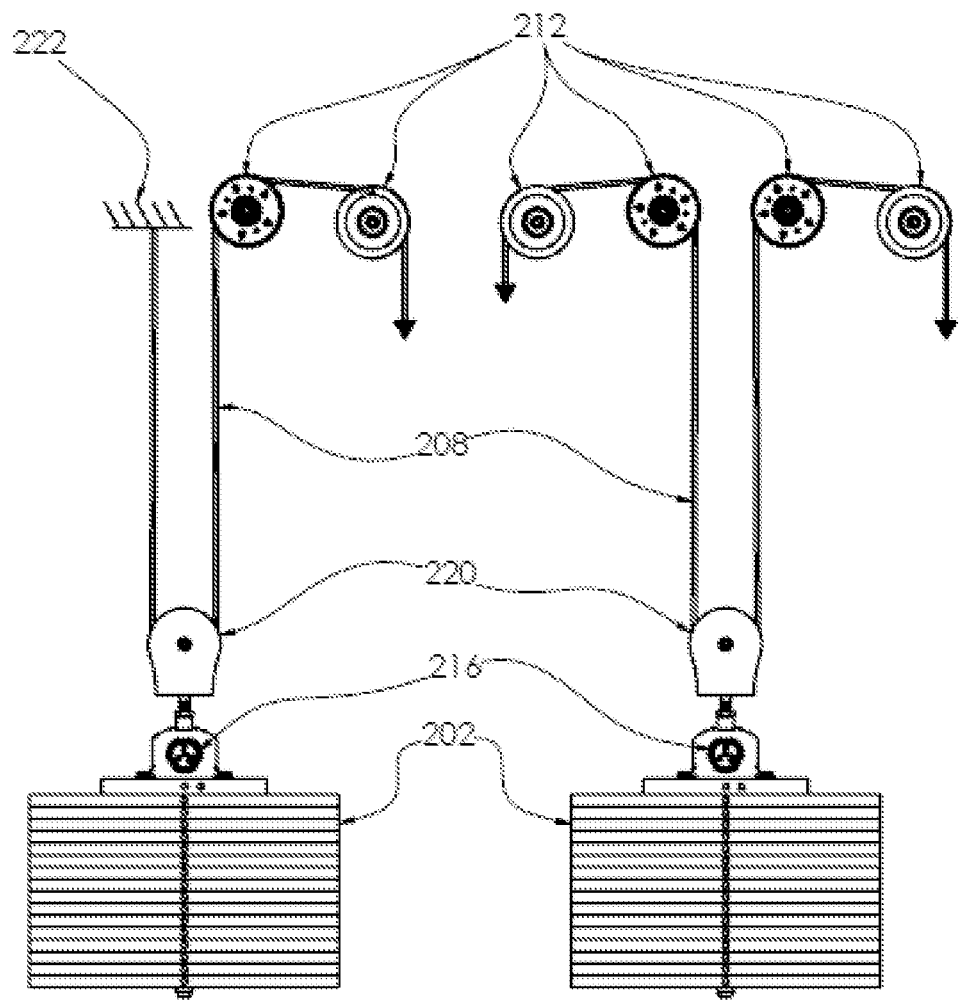

FIGS. 2A to 2C show three examples of the final cable 208 routing patterns that could be used to lift the weight stack 202 via the exercise resistive force 214 delivered from the exerciser. In FIG. 2A the cable 208 terminates directly into the weight selection bayonet 216 that is used to isolate which number of weight plates 204 will move during the exercise motion. In FIG. 2B the weight selection bayonet 216 is connected via a linkage to a weight stack pulley 220 that receives a cable 208 transmitting the exercise resistive force 214. In this example the cable 208 on one side of the weight stack pulley 220 terminates at a fixed anchor 222 while the other side is connected to move via the exercise resistive force 214 delivered during the exercise motion. FIG. 2C shows a similar configuration but rather than one side of the cable 208 terminating in fixed anchor 222, the cable 208 on both sides of the weight stack pulley 212 are redirected via pulleys 212 to transfer exercise resistive force 214 delivered during the exercise motion. Note that in each of these examples a stationary pulley 212 is used to redirect the cable 208 which is in tension due to the exercise resistive force 214 it is redirecting.

Some weight machines 200 will also allow the exerciser to make finer resistance setting adjustments by allowing additional incremental weights 224 to be combined with the major weight plates 204. If the major weight plate values are 15 lbs then the exerciser could be enabled to optionally add 5 or 10 lbs to achieve more granular control over the amount of weight lifted. For example, if the major weight plates 204 are 15 lbs and the exerciser had been lifting 100 lbs the next highest setting would be 115 lb if no incremental weights 224 were available, but by using the incremental weights 224 with incremental weight values of 5 lbs the intermediate values of 105 or 110 lbs can also be selected by adding one or two 5 lb incremental weights 224, respectively.

FIGS. 3A and 3B show a sample configuration for a weight stack 202 featuring incremental weights 224. The incremental weights 224 are typically engaged by the exerciser at the same time he/she selects the major weight plate values. When selected, the increment weights are functionally connected to the primary weight stack 202 and move in unison. The incremental weights 224 can be positioned behind the weight stack 202 and engaged or disengaged by rotating a selector knob 226 as shown in FIG. 3A or with a push/pull slider 228 as shown in FIG. 3B. As these two examples show there can be a single incremental weight 224 or two or more incremental weights 224. Alternatively, the incremental weights 224 could be mounted above the weight stack 202 then lowered such that they rest on top of the weights stack for additional mass when increased resistance is desired. In another embodiment the incremental weights 224 could be slid from a stationary storage position adjacent to the primary weight stack 202 onto the weight stack 202 or manually lifted and set on top of the weight stack 202 when desired.

An important metric in resistance training is the amount of resistance exerted by the exerciser during the exercise motion. The mass that is moved against gravity, or the weight setting, is an important factor in determining the resistance but the amount of acceleration imparted on that mass by the exerciser also contributes. The term weight setting generally refers to an amount of weight (e.g., a number of pounds) that corresponds to the combination of the weight plates 204 of the weight stack 202 and the incremental weights 224 that are lifted during an exercise. The resistive force is proportional to not only the mass but also its acceleration and deceleration relative to gravity. During a repetition with a 100 lb weight setting, the cable 208 will transmit resistive force values significantly in excess of 100 lbs-f while accelerating or significantly below 100 lbs-f while decelerating and only achieves a stable 100 lbs-f if the weight stack 202 is held static. The force data therefore provides much more granular insight into human performance including maximum force, peak force per repetition, rate of force development, fatigue, etc.

One method for force measurement on weight stack 202 machines involves a device that is attached to the cable 208 above the weight stack 202, but on some weight machines 200 this can restrict the range of motion because the physical footprint of the sensor restrains the motion the weight stack 202 can travel at its topmost extent. Another method is to configure an additional pulley 212 connected with a force transducer into the weight machine 200. If the pulley 212 changes the direction of the cable 208 then it can be used to detect the tension, or resistance transferred through that cable 208. This approach adds moving parts and therefore complexity, however. The additional cable 208 re-directions can also affect the life of the cable 208 on those machines which is impacted by the number of times it is flexed during routine operation.

Capturing force data while minimizing impact on the complexity, range of motion, or life of a selectorized weight machine 200 is beneficial. One way to do so is to measure the force transmitted through one of the pulleys 212 already present in the machine's design. Minimizing the changes to the design not only preserves simplicity but also enables the millions of machines already in existence to become retrofit with a sensor and therefore enabled to be capable of facilitating more engaging, digital user experiences.

Figure 4A:
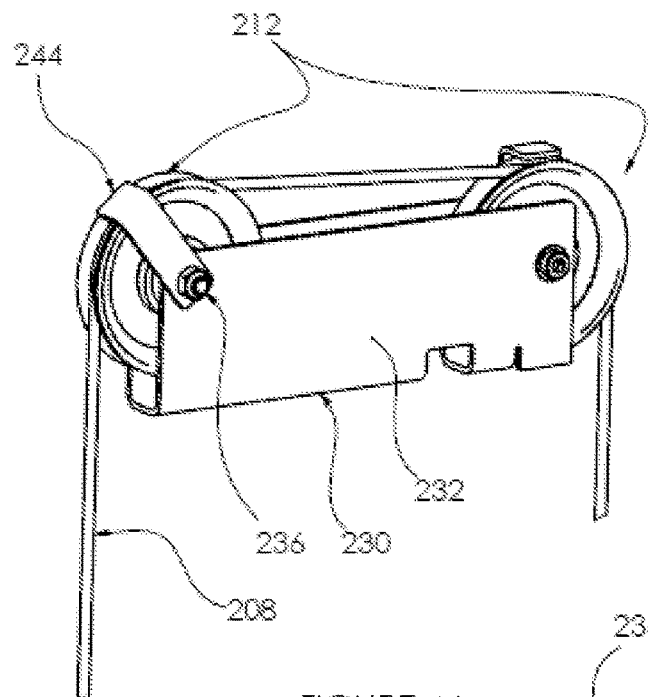
FIGS. 4A to 4C illustrate existing hardware on a weight machine (FIGS. 4A and 4B) and a modification of the existing hardware to include load sensing bolt to extract force data for the purpose of enhanced digital experiences (FIG. 4C).
Figure 4B:
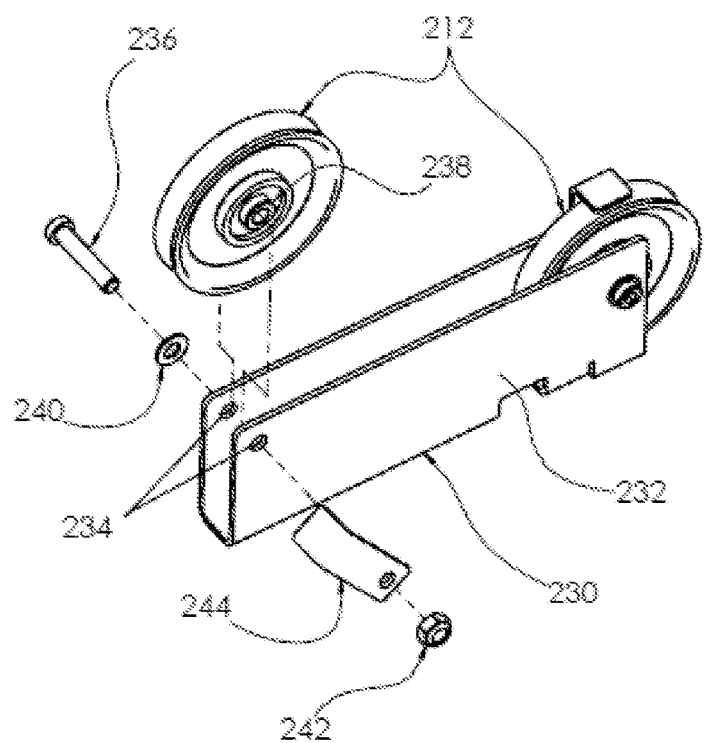

FIG. 4A shows a more detailed view of a pulley 212 on a weight machine 200 which in this example is positioned directly above the weight stack 202. A structural bracket 230 fixed to the weight machine 200 contains two vertical sidewalls 232 with bolt through-holes 234 designed to receive a pulley bolt 236. The pulley bolt 236 extends through both vertical sidewalls 232 of the structural bracket 230 and through the pulley bearing 238 such that the pulley 212 is positioned between the two vertical sidewalls 232. The pulley bolt 236, thereby, supports the pulley 212 relative to the weight machine 200 and, in particular, relative to the structural bracket 230. In another example, there could be a single sidewall with a pulley 212 mounted using a pulley bolt such that the pulley 212 is cantilevered off the side. The pulley bolt is secured using a washer 240 and nut 242. The vibrations experienced by the machine during routine use could cause the nut 242 to loosen, so a locking nut 242, locking washer 240, or locking compound on the threads of the pulley bolt could be used to ensure the nut 242 remains in position. In this example there is also a cable retention bracket 244 which is used to ensure that the cable 208 remains routed properly over the pulley 212. FIG. 4B shows an exploded view of the same configuration shown in FIG. 4A to show more detail.

Figure 4C:
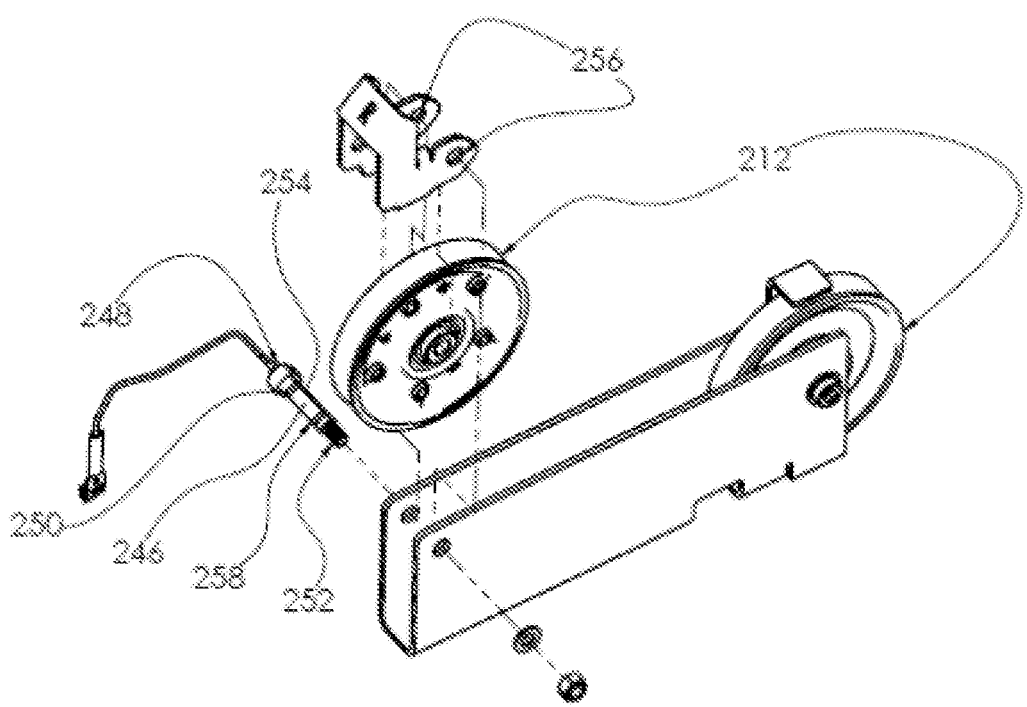

FIG. 4C shows a revised configuration in which the pulley bolt 236 has been replaced by a load sensing bolt 246. In this example the load sensing bolt 246 is sized to directly replace the pulley bolt 236 show in FIGS. 4A and 4B and functions to support the pulley 212 relative to the structural bracket 230 and sense the force applied by the pulley 212 thereto. The load sensing bolt 246 features a head 248 on one end followed by a smooth, unthreaded shoulder section 250. The diameter of the bolt 246 is then reduced for the final threaded section 252 which is capable of receiving a fastener such as a nut 242. The shoulder section 250 and the final threaded section 252 may be considered to form a shaft of the load sensing bolt 246, and with the head 248 may be considered to form a bolt.

The load sensing bolt 246 is configured to rotationally align with the weight machine 200 (e.g., the structural bracket 230), so as to orient strain gauges 260 (discussed in further detail below) relative to the weight machine 200 and/or relative to the force applied by the pulley 212 from the cable 208 (i.e., when the exercise resistive force 214 is applied thereto by the exerciser) in a predetermined orientation. The shoulder section 250 of the load sensing bolt 246 in this example features one or more (e.g., two) flat faces. A first of the flat faces may be an orientation face 254 that serves as the alignment feature to ensure that the load sensing bolt 246 is installed at the appropriate angle (i.e., the predetermined orientation) to detect force transmission with a high degree of resolution. The pulley bracket through-hole 256 in FIG. 4C is not circular, but rather specifically shaped to aid in the proper orientation of the load sensing bolt 246, and thereby functions as a complementary alignment feature to that of the orientation face 254 of the load sensing bolt 246. In this example the orientation face 254 is planar and will therefore align with flat section of the pulley bracket through-hole 256. The pulley bracket through-hole 256 may be part of the structural bracket 230, as originally provided or as modified to include. Alternatively, the pulley bracket through-hole 256 may be part of another bracket, such as a replacement to the cable retention bracket 244, the existing cable retention bracket 244 with a modification, or another bracket, that couples to the structural bracket 230 in another predetermined orientation. The pulley bracket through-hole 256, thus, orients the load sensing bolt 246 to the bracket and, thereby, to the structural bracket 230 and the weight machine 200.

A second of the flat faces of the shoulder section 250 may be a strain gauge face 258 that is designed to provide a surface for laminating one or more strain gauges 260 to the load sensing bolt 246. In one example of the predetermined orientation, the load sensing bolt 246 is oriented for the strain gauge face 258 and, thereby, the strain gauge 260 to be in tension when the resistive force 214 is applied to the cable 208 (e.g., generally or substantially opposite to a net force applied by the pulley 212 to the load sensing bolt 246). In another example of the predetermined orientation, the load sensing bolt 246 is orientated for the strain gauge face 258 and, thereby, the strain gauge 260 to be in shear when the resistive force 214 is applied to the cable 208 (e.g., substantially parallel to a net force applied by the pulley 212 to the load sensing bolt 246).

Figure 5:
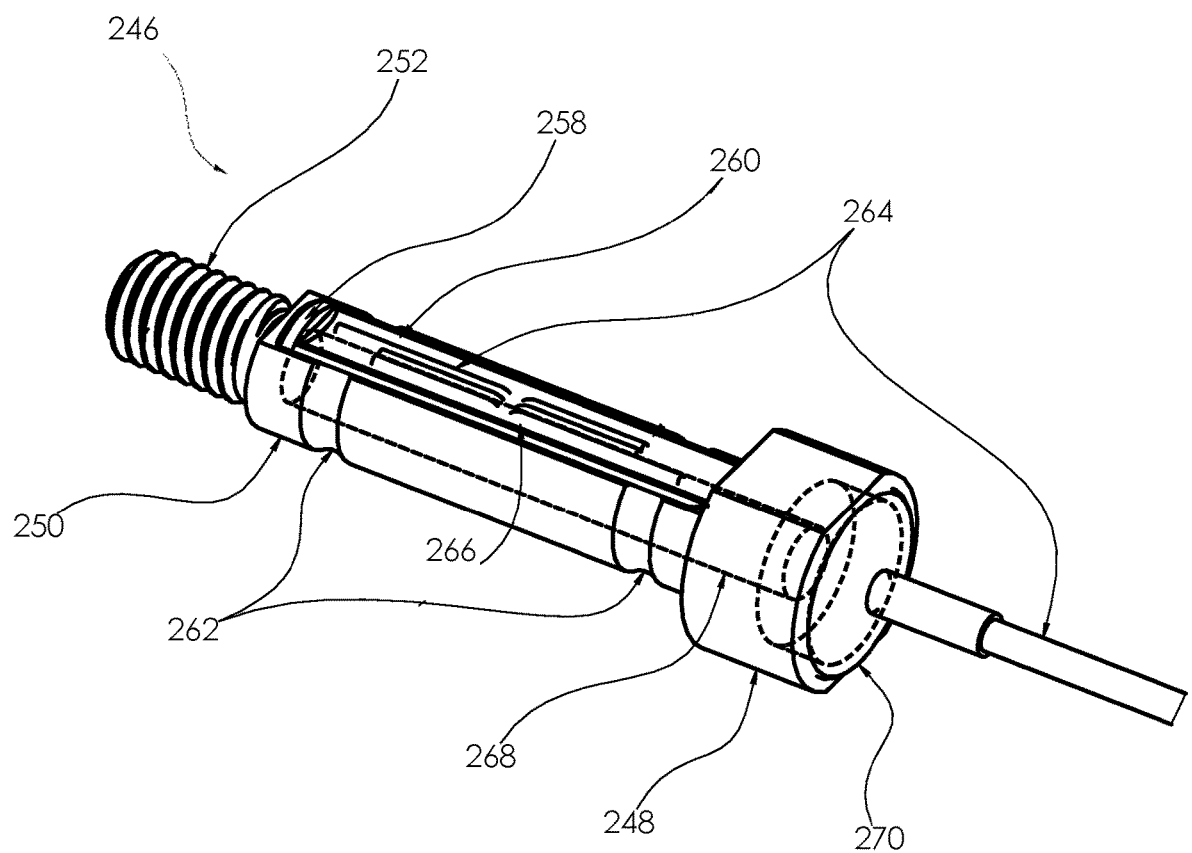
FIG. 5 illustrates a load sensing bolt in closer detail to show the functional components.

FIG. 5 shows the load sensing bolt 246 with the strain gauge face 258 oriented to display a sample orientation of strain gauges 260. One or more strain gauges 260 could be laminated onto a single surface, as shown, or on multiple strain gauge faces 258. The strain gauges 260 are resistive elements configured such that their resistance changes when the material to which they are laminated becomes deflected under load. The change in resistance is proportional to the amount of deflection caused by the load. The strain gauges 260 can be configured in a half-bridge or full-bridge configuration of a Wheatstone Bridge circuit such that the differential voltage signal indicates the magnitude of the load applied. An amplifier and processor on the weight machine 200 are used to interpret this data for calculation of exercise metrics. The output of the load sensing bolt 246 and, specifically, of the one or more strain gauges 260 (e.g., the differential voltage value) may be referred to as a force signal, which includes a force value (e.g., the voltage) that is indicative of the force sensed thereby.

Stress concentration geometries 262 such as the ones shown can be used to isolate the deflection into the region on which the strain gauges 260 are applied for an improved load measurement signal. Each stress concentration geometry 262 is a feature that concentrates bending stress to a region proximate one of more of the strain gauges 260. For example, as shown, the stress concentration geometry 262 may be a recess that protrudes radially into the load sensing bolt 246 (e.g., the shoulder section 250) and that is axially overlapping one or more of the strain gauges 260 (i.e., sharing a common location along an axis of the bolt 246) or axially adjacent to one or more of the strain gauges 260 (e.g., being within 10 mm, 5 mm, 2 mm, or less). The recess of the stress concentration geometry 262 may, for example, extend circumferentially at least partially the axis of the bolt 246 (e.g., other than the flat faces), be positioned generally radially opposite one or more of the strain gauges 260, have a uniform depth, and/or have a uniform cross-sectional shape (e.g., being partially circular).

In the example shown the strain gauge wires 264 enter a hole 266 in the orientation face exit via an axial cavity 268 in the load sensing bolt 246 then out the head 248. The head 248 of the load sensing bolt 246 could also feature a recessed cavity that could be filled with an epoxy or potting compound 270 to protect the wires exiting the load sensing bolt 246 and prevent them from being inadvertently damaged during installation or servicing. The length of the shoulder could be sized such that when the nut 242 is fully torqued onto the threads the vertical sidewalls 232 of the structural bracket 230 are compressed to a position that constrain the pulley 212 to a limited amount of lateral movement without allowing any portion of the pulley 212 to be clamped by the vertical sidewalls 232 which would impair force measurement.

The load sensing bolt 246 may be used when the structural bracket 230 is already designed or already deployed on weight machines 200 in the field. The diameter of the shoulder, for example, may be limited to the size of the bolt through-holes 234 of the vertical sidewalls 232 through which it must fit. In some scenarios the bolt through-holes 234 could be bored out larger to accommodate a larger diameter load sensing bolt 246 but this step could be skipped to eliminate the need for power tools for installation on machines which have already been field-deployed. The amount of surface area available for laminating the strain gauges 260 is therefore limited and the mechanical fixturing of the load sensing bolt 246 is limited to the structural elements originally designed for standard bolts.

Additional sensor inputs on the weight machine 200 can be used to supplement the data from the load sensing bolt 246 to preserve accuracy of the exercise metrics over the lifetime of the weight machine 200. For example, a processor on the machine 200 (e.g., the controller 296, as discussed below) can use the data produced by the load sensing bolt 246 to determine the weight setting used during an exercise but in some scenarios, this could require a high level of precision. For example, if the weight of the incremental weight 224 is 5 lbs then detecting the accuracy within the maximum deviation of 2.5 lbs on a weight stack 202 of 400 lbs would require an error of no more than 0.6%. If an additional sensor, such as an incremental weight sensor 297 (discussed below with respect to FIG. 9A), could detect the usage state of the incremental weights 224, however, then the load sensing bolt 246 would only need enough accuracy to detect error bounds dictated by the mass of the weight plates 204. So if the weight machine 200 had 15 lb weight plates 204 then the maximum deviation of 7.5 lb on a weight stack 202 of 400 lbs would require an error of no more than 1.9%, which is a more reasonable performance target particularly for space-constrained low cost force measurement technologies.

The incremental weight sensor 297 may be configured to detect which of the incremental weights 224 are being lifted or are to be lifted with the weight stack 202 during an exercise, for example, by detecting movement of the one or more incremental weights 224 (e.g., with reed switches or other magnetic sensors, physical contact switches, and/or optical sensors) and/or by detecting a setting indicative of which of the incremental weights 224 are to be lifted (e.g., optically). For example, the incremental weight sensor 297 may be configured to detect the movement or position of a detection component 298 that may be attached to an incremental weight selection device (e.g., the selector knob 226) or to the incremental weights 224 themselves. An output of the incremental weight sensor 297 may be referred to as an incremental weight signal, which is indicative of the incremental weight value being lifted or to be lifted for a given incremental setting. Various configurations of the incremental weight sensor 297 are discussed in further detail below with respect to FIGS. 6 and 7.

Figure 6:
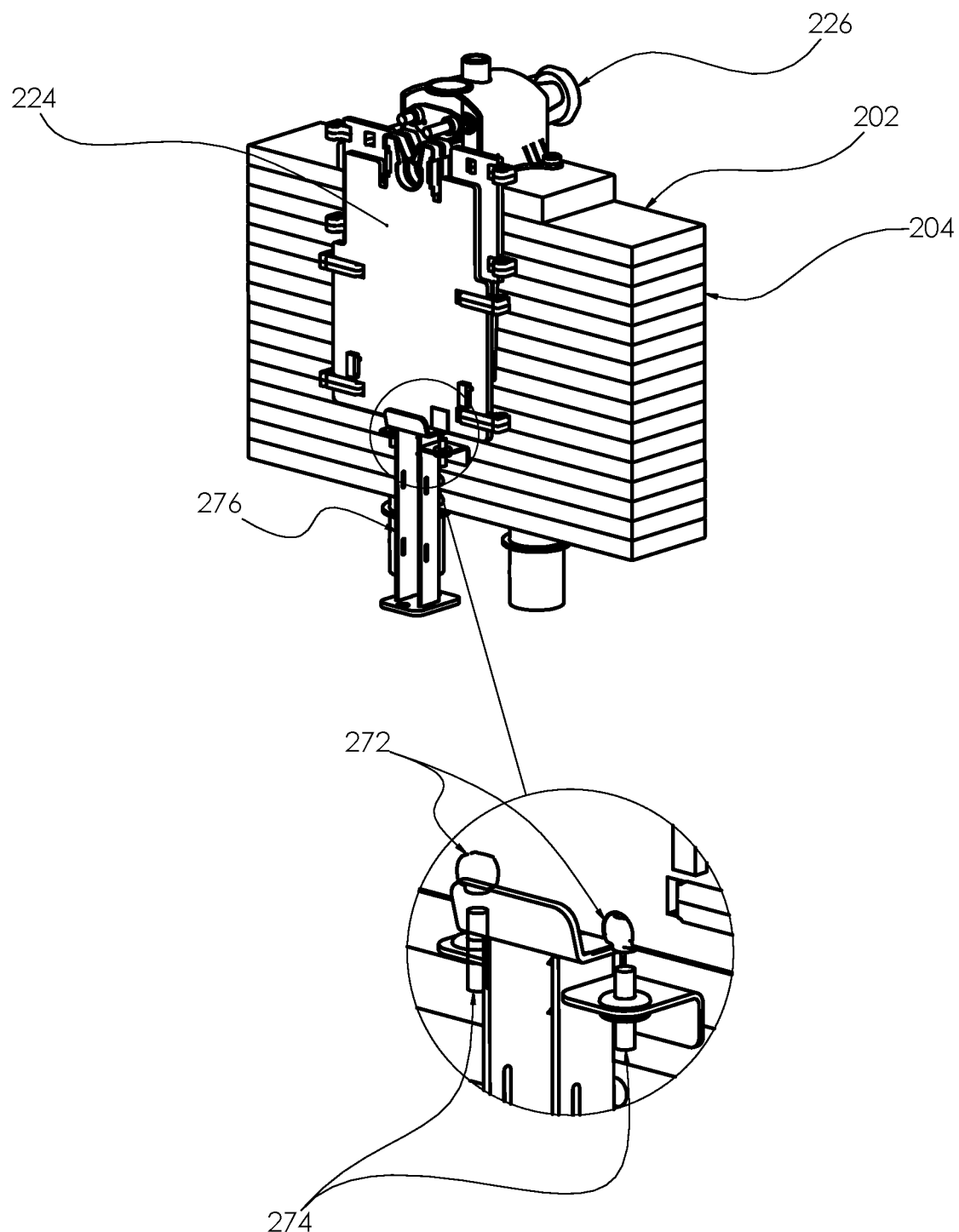
FIG. 6 shows a sample configuration of incremental weights that has integrated reed switch sensors to determine their usage state, thereby adding accuracy and longevity to the overall load sensing system.

FIG. 6 shows a view of the rear of the weight stack 202 featuring two incremental weights 224 which are engaged or disengaged via a selector knob 226 by the exerciser. In this example the exerciser can rotate the knob 226 to select one incremental weight 224 to add 5 lbs of weight or two incremental weights 224 to add 10 lbs. As noted previously there are many possible mechanisms for adding and subtracting incremental weights 224 and FIG. 6 is illustrating just one example. In this example the incremental weights 224 have magnets 272 attached which are detected by reed switches 274, which may be or otherwise form the incremental weight sensor 297 and the detection component 298, respectively, when in their resting position on the pedestal 276. If the increment weights are selected then they are joined with the weight stack 202 and therefore in motion during the exercise. The reed switches 274 will detect an absence of the incremental weights 224 because the magnetic field exceeds their detection range when the weighs are lifted. The reed switches 274 could also be positioned such that they are proximal to the magnets 272 mounted on the incremental weights 224 but then detect the engagement of the increment weights as the magnets 272 move past the reed switch during the exercise motion when the weight stack 202 is raised and lowered. Reed switches 274 are just one example of a type of sensor that can be used for detecting incremental weight usage, which may form the incremental weight sensor 297. In a further example, the incremental weight sensor 297 may include or be formed by one or more physical contact switches which are mechanically depressed could be used or optical sensors directed at the incremental weights 224 to determine their presence or absence during the exercise motion. In a still further example, the incremental weight sensor 297 may include or be formed by one or more reed switches 274 available from manufacturers like Magnasphere Corporation that also provide a magnetic field for detection of ferrous objects (e.g., the incremental weights 224, themselves) could also be used. This still further approach would eliminate the need for attaching magnets 272 to the incremental weights 224. The reed switches 274 output the incremental weight signal, which indicates which of the incremental weights 224 were lifted and/or the incremental weight value corresponding thereto.

FIG. 7 demonstrates another approach for detecting the usage of incremental weights 224 by using a ranging sensor 278, which may be or otherwise form the incremental weight sensor 297. These sensors use technologies such as light detection and ranging (LIDAR), ultrasonic ranging, or infrared ranging to detect the distance of objects toward which they are oriented. If the user selects the incremental weight 224 by rotating a knob 226 then multiple reflective surfaces 280, which may form the detection component 298, could be integrated into that knob 226 such that the reflective surface 280 is a different distance from the ranging sensor 278 depending on the orientation of the knob 226. A push-pull mechanism or other mechanisms could similarly be used to position a reflective surface 280 with a different distance from the ranging sensor 278 depending on the selection made by the exerciser. Multiple ranging sensors 278 could also be used such that one measures the distance to a fixed surface, the other measures the distance to a surface that varies depending on the incremental weight 224 selection, and the difference between the two values is used to determine the selection status of the incremental weights 224. The ranging sensor 278 outputs the incremental weight signal, which indicates which of the incremental weights 224 are to be lifted or the incremental weight value corresponding thereto.

As mentioned, a benefit of using a load sensing bolt 246 to replace existing bolts is that it can be used to retrofit weight machines 200 already in use in the field to enable enhanced, data driven user experiences. To function properly, however, the load sensing bolt 246 should be calibrated after it has been installed onto the weight machine 200. One way to perform a calibration is to lift the weight stack 202 then measure the signal coming from the load sensing bolt 246 at multiple different weight settings. The relationship between the weights being lifted and the signal received from the load sensing bolt 246 define a calibration fit (e.g., a weight function) which is then stored on the weight machine's 200 processor to determine exercise metrics in real-time. Lifting a large fraction of the weight stack 202 is often necessary to perform a calibration, but technicians and operators in the field are often incapable of performing such a task due to physical or regulatory limitations. Therefore a device to mechanically assist in the calibration procedure would be another important component of the concept described herein.

Figures 8A, 8B:
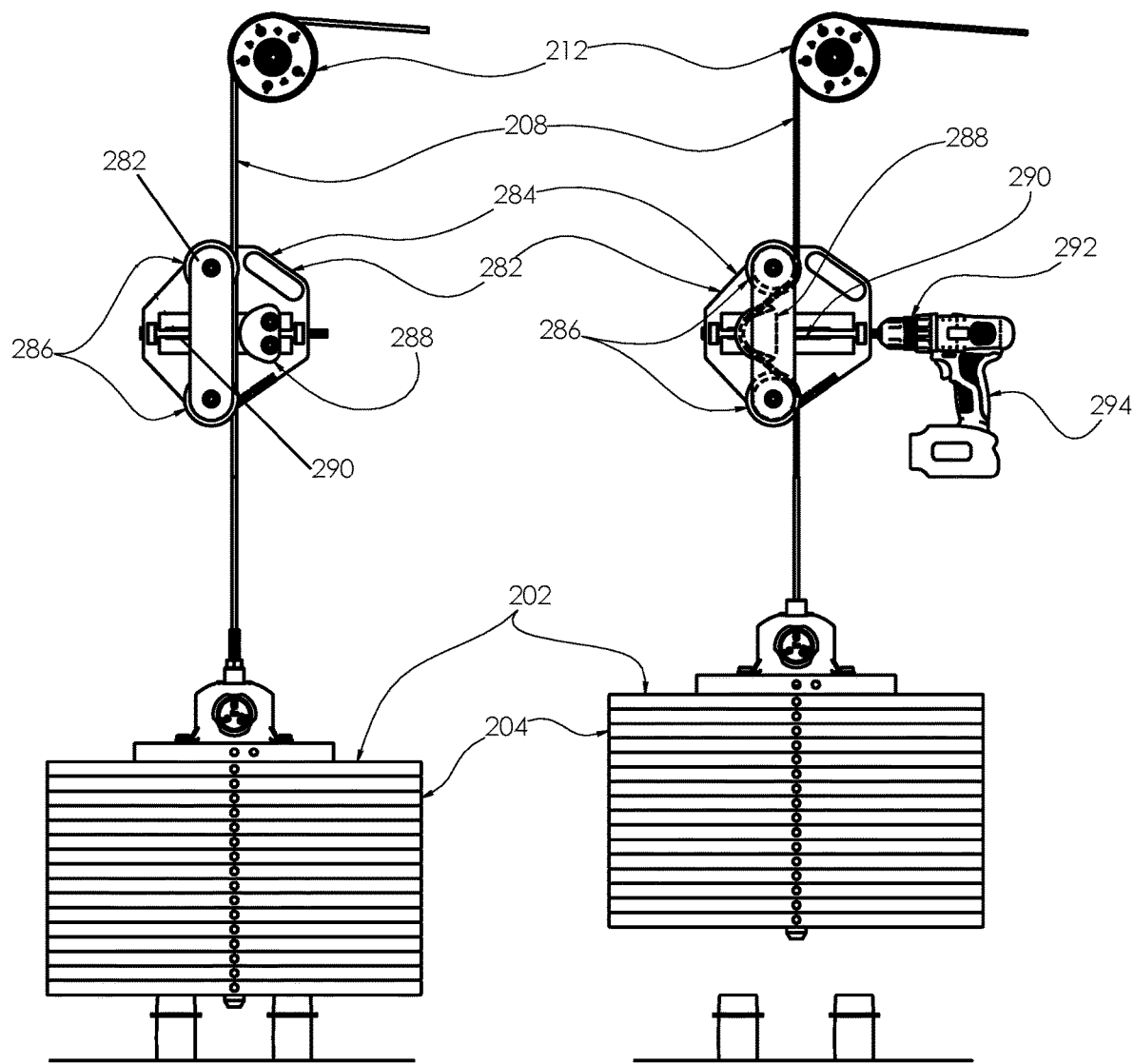
FIGS. 8A and 8B show a calibration tool that can be used to mechanically raise and lower the weight stack of a weight machine to assist with the calibration process.

FIGS. 8A and 8B show a calibration tool 282 for lifting the weight stack 204 during calibration. The calibration tool 282 includes a rigid frame 284 with three pulleys 286, 288, two of which are fixed pulleys 286 attached to the frame 284 and a third movable pulley 288 which is actuated along a track with a threaded rod 290 connected to the rigid frame 284. The threaded rod 290 is configured to provide sufficient mechanical to be driven by a drive source (e.g., an electric motor or drill as discussed below) and to prevent back driving from the weight stack 204. The movable pulley 288 could also be attached via a hinged connection or 4-bar mechanism to provide the actuated motion relative to the other fixed pulleys 286. FIG. 8A shows the calibration tool 282 in its initial state before the weight stack 202 has been lifted and FIG. 8B shows the tool in its secondary state after the movable pulley 288 has been actuated which causes the cable 208 length to be effectively shortened thereby lifting the weight stack 202. The length of cable 208 available to the calibration tool 282 varies from machine to machine and in some cases there is limited space above the weight stack 202. Not all of the pulleys 212 need to be able to rotate for the mechanism to work so they could be trimmed down and fixed to the rigid frame 284 or replaced with cams to help reduce the height of the tool. The example shown features a spindle 292 at the end of the threaded rod 290 which engages with the chuck of a handheld drill 294, but the calibration tool 282 could also include its own electric motor and drivetrain to eliminate the need for the handheld drill 294 or other external actuator.

Figure 9A:
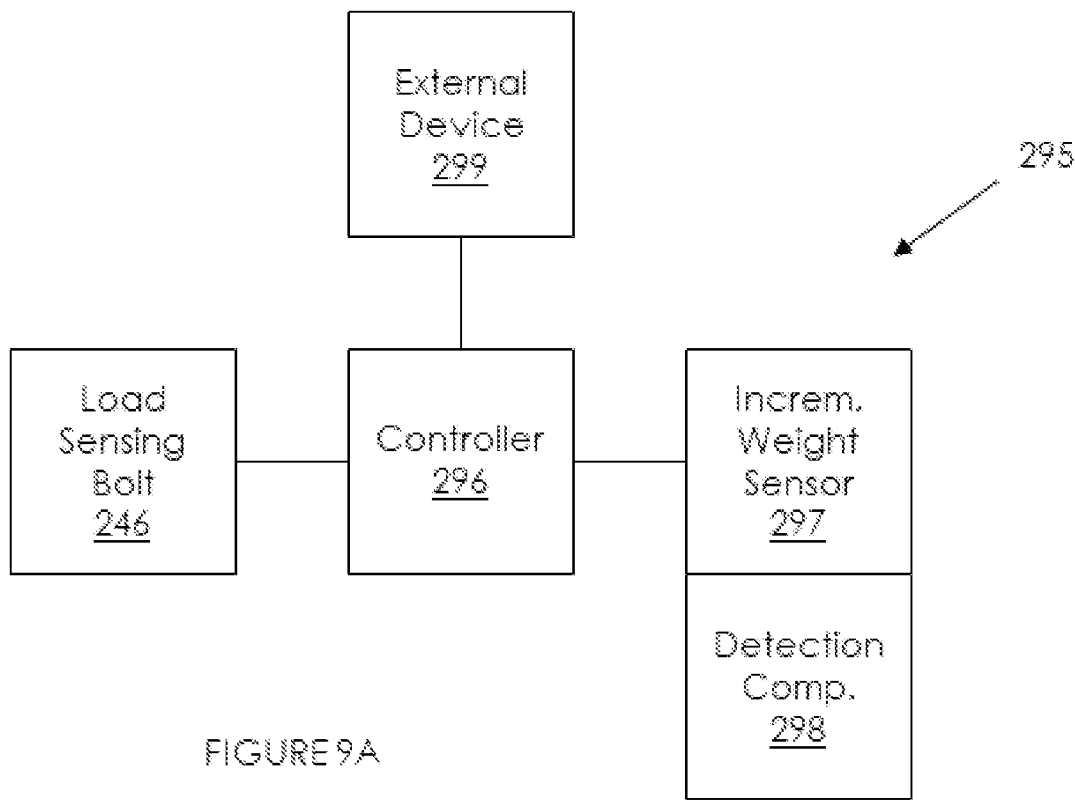
FIG. 9A is a schematic of a weight machine sensor system that may include the load sensing bolt and an incremental weight sensor.

FIG. 9A is a schematic illustration of a weight machine sensor system 295 that generally includes a controller 296 and the load sensing bolt 246 and may further include the incremental weight sensor 297. The controller 296 is in communication with the load sensing bolt 246 and the incremental weight sensor 297, if provided, and determines a weight setting according to the force sensed by the load sensing bolt 246 and the incremental weight signal received from the incremental weight sensor 297 (if included). The controller 296 may further be in communication with an external device 299, directly or indirectly, such as a personal electronic device of the exerciser (e.g., a smart watch or smartphone) or a computing system (e.g., a local and/or remotely-located computing system) to which the controller 296 may send weight information (e.g., the weight setting, repetitions, and timing, among other information).

Figure 9B:
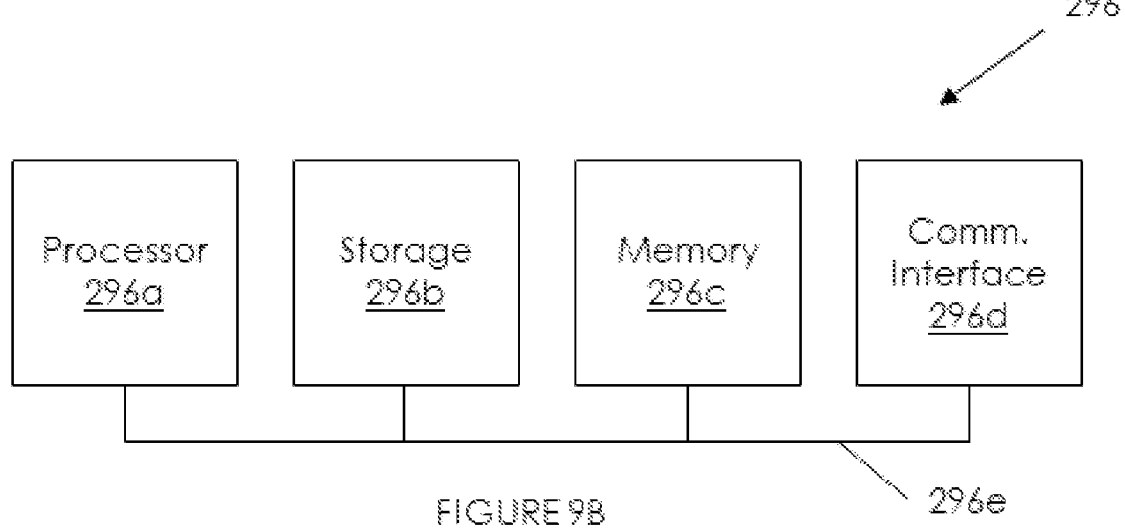
FIG. 9B is a schematic of an example hardware configuration of a controller of the weight machine sensor system.

FIG. 9B illustrates one example hardware configuration for a controller 296, though it should be understood that any device capable of performing the functions and instructions of the controller 296 may be utilized. The controller 296 generally includes a processor 296*a*, a storage 296*b*, a memory 296*c*, a communications interface 296*d*, and a bus 296*e* by which the other components or aspects of the controller 296 are in. The processor 296*a* may be any suitable processing device, such as a central processing unit (CPU), capable of executing written instructions (e.g., software) to perform the methods described herein. The storage 296*b* may be any long term, non-volatile memory device, such as a solid state drive capable of storing the instructions executed by the processor 296*a*. The storage 296*b* may be considered to be or include a computer readable medium. The memory 296*c* is a short term, volatile memory device, such as a random access memory module. The communications interface 296*d* may be any device or combination of devices configured to send and/or receive signals (e.g., to and/or from the load sensing bolt 246 and the incremental weight sensor 297, and/or to the external device 299.

Figure 10:
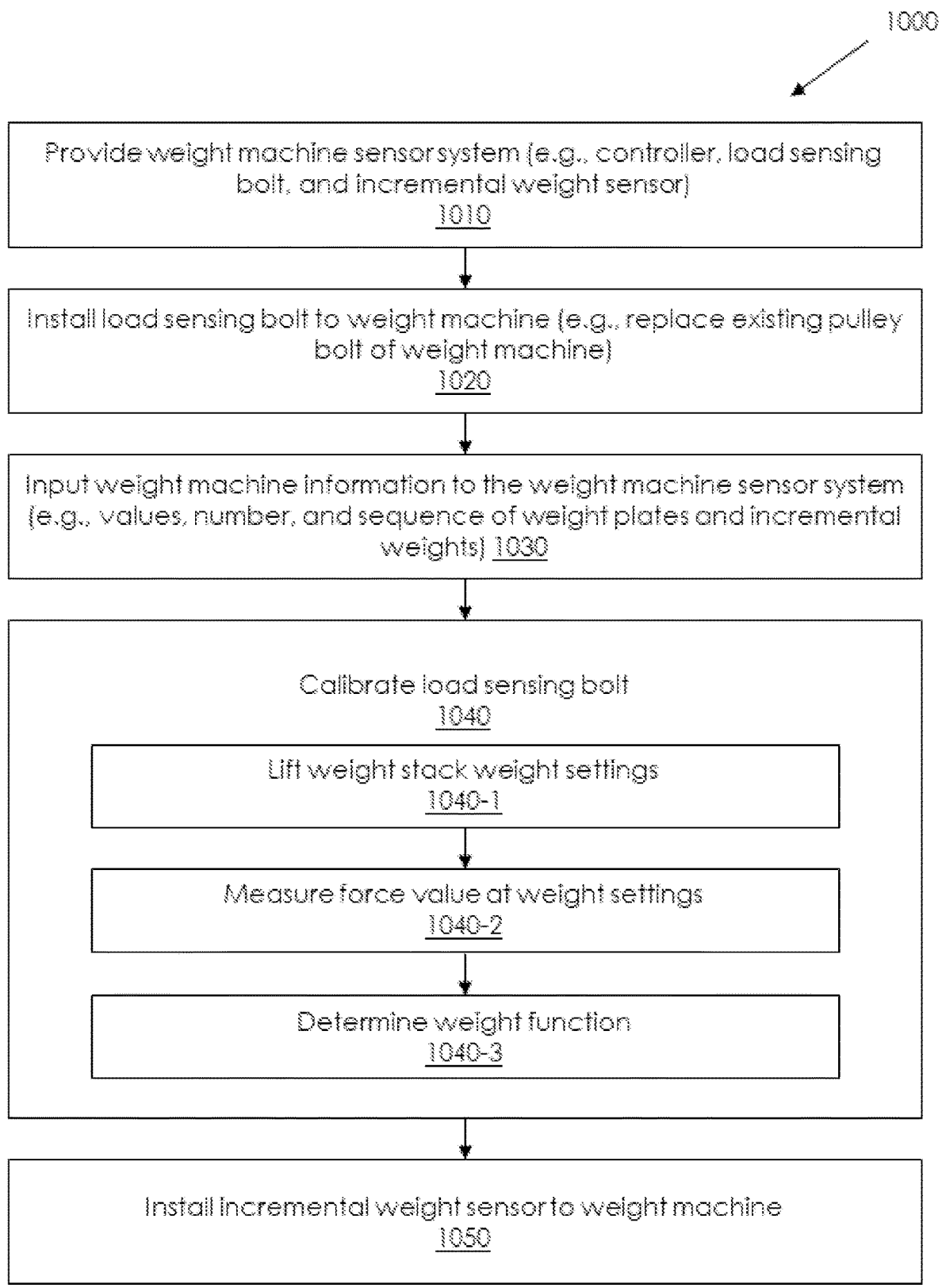
FIG. 10 is a flowchart of a method of retrofitting a weight machine with a weight machine sensor system.

Referring to FIG. 10, a weight machine 200 may be retrofit with the weight machine sensor system 295, which is then calibrated to that particular weight machine 200.

To retrofit the weight machine 200 with the weight machine sensor system 295, the pulley bolt 236 is replaced with the load sensing bolt 246 (e.g., the pulley bolt 236 is removed, and the load sensing bolt 246 is inserted through the structural bracket 230 and the pulley 212 to support and couple the pulley 212 to the structural bracket 230). The load sensing bolt 246 is also oriented relative to the weight machine 200 in the predetermined orientation. The weight machine 200 is also retrofit to include the alignment feature (e.g., a flat face) that corresponds to the orientation face 254 of the load sensing bolt 246, for example, by retrofitting the structural bracket 230 to include the alignment feature (i.e., the pulley bracket through-hole 256 that includes a flat face or is otherwise not circular), retrofitting the cable retention bracket 244 to include the alignment feature, or replacing the cable retention bracket 244 with another cable retention bracket 244 that includes the alignment feature and itself orients to the weight machine 200 (e.g., the structural bracket 230) in another predetermined orientation.

To calibrate the weight machine sensor system 295, the weight machine 200 is placed into different weight settings, the weight stack 202 is lifted (e.g. with the calibration tool 282, as described above), force values (e.g., voltages) are recorded for each of the different weight settings, and a weight function is fit to the force values at the different weight settings (e.g., a second order polynomial). The different weight settings may, for example, include at least three different weight settings, one at a lower weight setting (e.g., lifting relatively little weight, such as one or two of the weight plates 204), one at a higher weight setting (e.g., lifting relatively high weight, such as all but one or two of the weight plates 204), and one or more at a middle weight setting (e.g., lifting weight approximately midway between the lower and higher weight settings). During use, the weight function is used in conjunction with force values from the force signal to determine a measured weight value and also determine the weight setting, as described in further detail below with respect to FIG. 11.

The controller 296 is further programmed, either during the calibration process or a separate step, with characteristics of the weight machine 200 and, in particular, weight values of the weight plates 204 of the weight stack 202 (e.g., the weight plate values) and the incremental weights 224 (e.g., the incremental weight values. This programming may further include other information, such as the number of the weight plates 204 at each of one or weight plate values, sequencing of the weight plates 204 at each of the weight plate values (e.g., two 30 lb weight plates are required before adding any of ten 15 lb weight plates), and the number of the incremental weights 224 at each of the one or more incremental weight values.

FIG. 10 is a flowchart of a method 1000 for retrofitting a weight machine 200 with the weight machine sensor system 295. The method 1000 generally includes providing 1010 the weight machine sensor system 295, installing 1020 the load sensing bolt 246 of the sensor system 295, inputting 1030 weight machine information to the weight machine sensor system 295, and calibrating 1040 the load sensing bolt 246. The method 1000 may further include installing 1050 the incremental weight sensor 297 of the weight machine sensor system 295.

The providing 1010 of the weight machine sensor system 295 generally includes providing the load sensing bolt 246 and the controller 296 and may further include providing the incremental weight sensor 297 (if included).

The installing 1020 of the load sensing bolt 246 generally includes replacing an existing pulley bolt 236 of the weight machine 200 with the load sensing bolt 246 (e.g., removing the existing pulley bolt 236 and inserting the load sensing bolt 246 to support the pulley 212 relative to the weight machine 200). The installing 1020 of the load sensing bolt 246 may further include retrofitting an alignment feature to the weight machine 200 (e.g., retrofitting the pulley bracket through-hole 256 to be non-circular in the existing structural bracket 230 or the existing cable retention bracket 244, or providing a new cable retention bracket 244 or another bracket that includes the pulley bracket through-hole 256 that is non-circular), and may still further include orientating the load sensing bolt 246 relative to the weight machine 200 in the predetermined orientation (as described previously). The installing 1020 may further include connecting the load sensing bolt 246 with the controller 296, for example, with the gauge wire 264 to transfer power and signals therebetween.

The inputting 1030 of the weight machine information generally includes providing information about the weight plates 204 of the weight stack 202 and the incremental weights 224 into the controller 296 with any suitable device (e.g., a computing device connectable to the controller 296). The information may, for example, include the weight values, numbers, and sequencing of the weight plates 204 of the weight stack 202 and the incremental weights 224.

The calibrating 1040 of the load sensing bolt 246 generally includes lifting 1040-1 the weight stack 202 repeatedly at one or more different weight settings, measuring 1040-2 a force value at each of the different weight settings, and determining 1040-3 a weight function for the force values at each of the different weight settings.

The lifting 1040-1 of the weight stack 202 repeatedly at the different weight settings may performed with the calibration tool 282 as described above or any other suitable device or method. The different weight settings may, for example, include relatively low, relatively high, and middle weight settings, as described previously.

The sensing 1040-2 of the force value at each of the different weight settings includes sensing a force value with the load sensing bolt 246, and sending the force value in a force signal from the load sensing bolt 246 to the controller 296. The force value may, for example, be a voltage output by the load sensing bolt 246.

The determining 1040-3 of the weight function may be performed by the controller 296 in any suitable manner, for example, by filtering the force signals to determine singular force values at each of the weight settings and using a curve fitting algorithm to determine the weight function from the singular force values and the weight settings. As referenced above, the weight function may be a second order polynomial but may be any other suitable function appropriate for the characteristics of the strain gauges 260 (e.g., linear function). During subsequent use, force values (e.g., voltages) may be input to the weight function, which then outputs a weight measurement value.

The installing 1050 of the incremental weight sensor 297 generally includes attaching the incremental weight sensor 297 to the weight machine 200, as may be required by the type of the incremental weight sensor 297, and attaching any corresponding detection component 298 (e.g., the magnets 272 or the reflective surface 280) to the weight machine 200 (e.g., to the incremental weights 224 or the incremental weight selection device). The installing 1050 of the incremental weight sensor may further include connecting the incremental weight sensor 297 with the controller 296, for example, via a wired connection to transfer power and signals therebetween.

Variations of the method 1000 are contemplated. For example, the load sensing bolt 246 may be initially installed in a new weight machine 200 (i.e., not retrofitting) and/or the calibrating 1040 may be performed as separate method.

Figure 11:
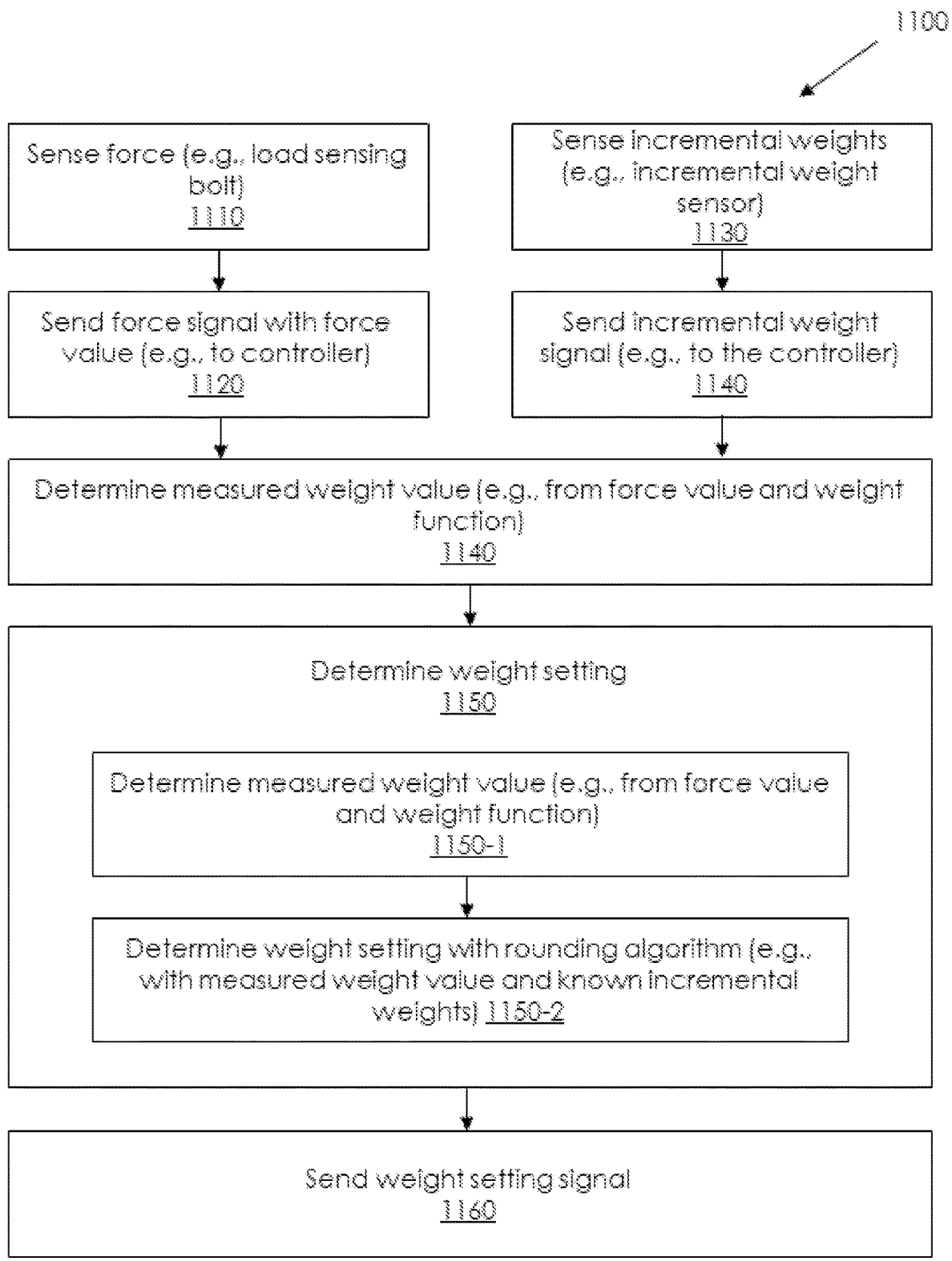
FIG. 11 is a flowchart of a method of determining a weight machine setting during an exercise with a weight machine sensor system.

Referring to FIG. 11, a weight setting of the weight machine 200 may be determined according to the load sensing bolt 246 alone or in conjunction with the incremental weight sensor 297. The load sensing bolt 246 sends the force signal to the controller 296, which includes the force value (e.g., the voltage) indicative of the force applied to the load sensing bolt 246. The incremental weight sensor 297 sends the incremental weight signal to the controller 296, which includes information indicative of the incremental weights 224 being lifted or to be lifted (for a given incremental weight setting).

To determine the weight setting, the controller 296 receives the force value via the force signal from the load sensing bolt 246, and inputs the force value into the weight function (determined from the calibration process, described previously) to obtain a measured weight value. The measured weight value is then rounded, using any suitable rounding function or algorithm, to the nearest possible weight setting determined according to the weight values, numbers, and sequencing of the weight plates 204 and the incremental weights 224, as well as the incremental weight signal.

In a first example, the rounding algorithm rounds the weight measurement value to the nearest increment of the smallest incremental weight value to determine the weight setting. For example, if the weight measurement value is 182 lbs and the smallest incremental weight value is 5 lbs, the weight setting would be determined to be 180 lbs. This first example of the rounding algorithm may be performed without the incremental weight signal (e.g., in embodiments of the weight machine sensor system 295 without the incremental weight sensor 296).

In a second example, the rounding algorithm first subtracts the known incremental weight values (i.e., from the incremental weight signal) from the measured weight value, then subtracts the plate weight values until achieving a negative value, and then compares the magnitudes of the negative value and the last positive value with the lower magnitude corresponding to the weight setting. By first subtracting the known incremental weight values and subsequently the plate weight values, the rounding algorithm allows for greater error in the weight measurement value while still determining the correct weight setting. For example, Table 1 represents this rounding algorithm applied to a weight measurement of 182 lbs on a weight machine 200 having weight plate values sequenced as 30 lbs for plates 1 and 2, 15 lbs for plates 3 to 10, and incremental weight values of 5 lbs for two incremental weights of which one is known to be used (i.e., via the incremental weight signal).

TABLE 1

|  | Decremented Weight Measurement | Incremental/ Plate Weight Value | Running Weight Setting |
| --- | --- | --- | --- |
| Initial Weight Measurement | 182 | | |
| Incremental Weight | 177 | 5 | 5 |
| Plate 1 | 147 | 30 | 35 |
| Plate 2 | 117 | 30 | 65 |
| Plate 3 | 102 | 15 | 80 |
| Plate 4 | 87 | 15 | 95 |
| Plate 5 | 72 | 15 | 110 |
| Plate 6 | 57 | 15 | 125 |
| Plate 7 | 42 | 15 | 140 |
| Plate 8 | 27 | 15 | 155 |
| Plate 9 | 12 | 15 | 170 |
| Plate 10 | −3 | 15 | 185 |

At plate 10, the decremented weight measurement is negative at −3 lbs. At plate 9, the last positive decremented weight measurement is 12 lbs, which has a magnitude that is greater than that of −3 lbs at plate 10. Therefore, the weight setting is determined to be that corresponding to plate 10, which is 185 lbs.

FIG. 11 is a flowchart of a method 1100 for determining a weight setting of a weight machine with the weight machine sensor system 295. The method 1100 generally includes sensing 1110 force, sending 1120 a force signal, sensing 1130 the incremental weights with the incremental sensor 297, sending 1140 an incremental weight signal from the incremental sensor 297 to the controller 296, and determining 1150 the weight setting with a rounding algorithm. The method 1100 may further include sending a weight setting signal to an external device (e.g., a computing device of the exerciser or a computing system).

The sensing 1110 of the force and the sending 1120 of the force signal are performed with the load sensing bolt 246.

The sensing 1130 of the incremental weights and the sending 1140 of the incremental weight signal are performed with the incremental weight sensor 297, and may be performed in parallel with the sensing 1110 and the sending 1120. The sensing 1130 and the sending 1140 are not performed by embodiments of the weight machine sensor system 200 that do not include the incremental weight sensor 297.

The determining 1150 of the weight setting is performed with the controller 296. The determining 1150 includes calculating 1150-1 a weight measurement from the force value (e.g., the voltage) using the weight function (e.g., as determined during the calibration process described previously). The rounding 1150-2 of the weight measurement to the nearest possible weight setting according to any suitable algorithm, including those describe previously (e.g., rounding the weight measurement value to the nearest value at the lowest value of the incremental weights, or subtracting the known incremental weights and weight plate values until achieving a negative value, the weight setting corresponding to the lower magnitude of the negative value or the lowest positive value).

The sending 1160 of the weight setting signal is performed with the controller 296. The weight setting signal includes information indicating the weight setting for a particular exercise, and is sent to one of the external devices 299 (e.g., of the exerciser or a computing system).

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the OS X, macOS, and iOS operating systems distributed by Apple Inc. of Cupertino, California, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A weight machine sensor system for determining a weight setting of a weight machine having weight plates and incremental weights to be lifted during an exercise, the weight machine sensor system comprising:

a load sensing bolt configured to support a pulley of the weight machine and including a strain gauge for sensing force transferred from the weight plates and the incremental weights by the pulley to the load sensing bolt; and a controller in communication with the load sensing bolt, wherein the controller determines a weight setting of the weight machine according to the load sensing bolt.

2. The weight machine sensor system of claim 1, wherein the strain gauge is laminated onto an exterior surface of a shoulder section of the bolt for sensing force applied by the pulley to the bolt.

3. The weight machine sensor system of claim 2, wherein the bolt is configured to orient the strain gauge relative to the weight machine.

4. The weight machine sensor system of claim 3, wherein the bolt includes an alignment feature the shaft to control orientation of the strain gauge relative to the weight machine, the alignment feature being a flat face of the shoulder section of the bolt.

5. The weight machine sensor system of claim 4, wherein the alignment feature of the bolt mates with a corresponding alignment feature of a bracket of the weight machine, the corresponding alignment feature being a non-circular through-hole that mates with the alignment feature of the bolt to control the orientation.

6. The weight machine sensor system of claim 3, wherein the bolt is configured to orient the load sensor with the strain gauge being in one of tension or shear when the pulley is loaded.

7. The weight machine sensor system of claim 2, wherein the shoulder section includes a stress concentration geometry proximate the strain gauge.

8. The weight machine sensor system of claim 7, wherein the stress concentration geometry axially overlaps the strain gauge.

9. The weight machine sensor system of claim 8, wherein the stress concentration geometry is a recess extending circumferentially at least partially around an axis of the bolt.

10. The weight machine sensor system of claim 2, wherein the shoulder section includes a stress concentration geometry that axially overlaps the strain gauge, the stress concentration geometry being a recess extending circumferentially at least partially around an axis of the bolt;

wherein the bolt is configured to orient the strain gauge relative to the weight machine in a predetermined orientation, the bolt including an alignment feature that is a flat face of the shoulder section that mates with a corresponding alignment feature of a bracket of the weight machine, the corresponding alignment feature being a non-circular through-hole;

wherein the predetermined orientation includes the strain gauge being in one of tension or shear when the pulley is loaded.

11. The weight machine sensor system of claim 1, further comprising an incremental weight sensor configured to sense the one or more incremental weights lifted during an exercise, wherein the controller is in communication with the incremental weight sensor and determines the weight setting of the weight machine according to the load sensing bolt and the incremental weight sensor.

12. The weight machine sensor system of claim 11, wherein the controller calculates a weight measurement value from the force sensed by the load sensing bolt, and determines the weight setting with a rounding algorithm according to the weight measurement value and a signal received from the incremental weight sensor indicating the incremental weights lifted during the exercise.

13. The weight machine sensor system of claim 12, wherein the rounding algorithm accounts for weight values, numbers, and sequencing of the weight plates.

14. The weight machine sensor system of claim 1, wherein the controller calculates a weight measurement value from the force sensed by the load sensing bolt, and determines the weight setting by rounding the weight measurement value.

15. The weight machine sensor system of claim 14, wherein the load sensing bolt is calibrated to the weight machine, and the controller determines the weight measurement value according to a force value output by the load sensing bolt from sensing the force and a weight function determined when the load sensing bolt was calibrated to the weight machine, the force value being a voltage.

16. A method for retrofitting a weight machine with a weight machine sensor system that is configured to determine a weight setting of the weight machine during an exercise, the weight machine being of a type having a weight stack with weight plates that are to be lifted during the exercise, the method including:

providing a weight machine sensor system that includes a load sensing bolt and a controller;

replacing a pulley bolt of the weight machine with the load sensing bolt to support a pulley of the weight machine, the load sensing bolt being configured to sense force applied by the pulley thereto; and calibrating the load sensing bolt to determine a weight function by which a weight measurement value is capable of being determined from a force value output by the load sensing bolt.

17. The method of claim 16, wherein the weight machine is of a type having incremental weights that are selectively lifted with the weight plates of the weight stack during the exercise, the weight machine sensor system includes an incremental weight sensor, and the method further includes installing the incremental weight sensor to the weight machine;

wherein the incremental weight sensor is configured to sense which of the incremental weights are lifted during the exercise; and wherein the calibrating includes lifting the weight stack at different weight settings, measuring force values at the different weight settings, and determining the weight function according to the force values and the different weight settings.

18. The method of claim 16, wherein the weight machine is of a type having incremental weights that are to be selectively lifted with the weight plates of the weight stack during the exercise, and the weight machine sensor system includes an incremental weight sensor, the method further comprising:

installing the incremental weight sensor to the weight machine, the incremental weight sensor being configured to sense which of the incremental weights of the weight machine are lifted during the exercise.

19. The method of claim 16, wherein the calibrating includes lifting the weight stack at different weight settings, measuring force values at the different weight settings, and determining the weight function according to the force values and the different weight settings.

20. The method of claim 19, wherein the lifting of the weight stack is performed with a calibration tool that includes a rigid frame, first and second pulleys fixed to the rigid frame, and a third pulley movable relative to the first and second pulleys to effectively shorten a cable and, thereby, lift the weight stack, the third pulley being movable along a threaded rod by an electric motor.

* * * * *